United States Patent [19]

Hegemann et al.

[11] Patent Number: 4,534,418
[45] Date of Patent: Aug. 13, 1985

[54] SPRING TEETH

[75] Inventors: Fritz Hegemann; Horst Beihammer, both of Werdohl, Fed. Rep. of Germany

[73] Assignee: Krupp Brüninghaus GmbH, Werdohl, Fed. Rep. of Germany

[21] Appl. No.: 447,259

[22] Filed: Dec. 6, 1982

[30] Foreign Application Priority Data

Dec. 5, 1981 [DE] Fed. Rep. of Germany ....... 3148260

[51] Int. Cl.³ .............................................. A01B 23/00
[52] U.S. Cl. ..................................... 172/708; 172/711
[58] Field of Search .............. 172/707, 708, 711, 705, 172/643, 710

[56] References Cited

U.S. PATENT DOCUMENTS

| 327,340 | 9/1885 | Stanton | 172/711 |
|---|---|---|---|
| 2,627,798 | 2/1953 | Graham | 172/708 |
| 2,707,909 | 5/1955 | Ampe | 172/707 X |
| 2,772,615 | 12/1956 | Smith | 172/708 |
| 3,157,234 | 11/1964 | Bezzerides | 172/711 |
| 3,921,727 | 11/1975 | Andersen | 172/708 |
| 4,453,602 | 6/1984 | Larsen | 172/707 |

FOREIGN PATENT DOCUMENTS

| 278115 | 11/1966 | Australia | 172/711 |
|---|---|---|---|
| 1757146 | 2/1971 | Fed. Rep. of Germany | 172/707 |
| 2810804 | 10/1978 | Fed. Rep. of Germany | 172/707 |
| 306195 | 11/1968 | Sweden | 172/707 |

Primary Examiner—Richard J. Johnson
Attorney, Agent, or Firm—Spencer & Frank

[57] ABSTRACT

A spring tine for an agricultural implement for soil cultivation, composed of a bent spring blade having an upper end constituting a point of fastening for releasable attachment to the implement and having a lower end, and a carrier for the attachment of a working member for performing soil cultivation which causes a force to act on the tine along the line of action, the carrier being connected to the lower end of the spring blade and the spring blade having a cross section which varies over its length in such a manner that the axial area moment of inertia I of a cross-sectional plane, divided by one-half the blade thickness, is proportional to the linear distance of that cross-sectional plane from the line of action of the force acting on the tine.

10 Claims, 6 Drawing Figures

2

SPRING TEETH

BACKGROUND OF THE INVENTION

The present invention relates to spring tines for agricultural implements for soil cultivation, such as harrows, cultivators or the like, of the type which is provided with a curved spring blade whose upper end is designed as the fastening location for releasable fastening to the implement and whose lower end is releasably or nonreleasably connected with a carrier for the attachment of a working member, such as harrow tips, plowshares or the like.

An agriculturel implement for soil cultivation equipped with spring tines is dragged over the ground by means of a tractor. The working members of the spring tines thereby enter into the soil and loosen it. If a working member encounters a solid obstacle in the ground, the spring blade of the spring tine causes the tine to be elastically deformed. Thus, the working member is able to move around the obstacle.

German Auslegeschrift [Published Patent Application] No. 1,757,146 discloses a spring tine of the above-mentioned type. The spring blade of this spring tine has a cross section which is constant over its length and which is composed of two parallel long sides and two oppositely disposed short sides which form an approximate rectangle. The drawback of this known spring tine is that its spring blade of constant cross section is poorly utilized with respect to tension. When the spring tine is deflected, different stresses develop along the spring blade since different bending moments appear along its length. The point of greatest stress is at the cross section farthest removed from the point where the force attacks since the bending moment is known to be defined by force times lever arm. Thus, this uppermost cross section of a spring blade having a constant cross section is the point of maximum tension and thus the point at which the spring blade is in the greatest danger of breaking. To avoid the danger of breaking, in the prior art spring tines, there now exists the possibility of reinforcing the spring blade by means of a second spring blade or of enlarging the unvarying thickness of the spring blade as a whole, which, however, results in poorer material utilization of the spring steel.

SUMMARY OF THE INVENTION

It is an object of the present invention to construct such a spring tine in such a way that in the portion which has the greatest spring effect, almost the same tension, or stress, occurs in all cross sections in dependence on the varying spring force so as to achieve good material utilization of the spring material and reduce the danger of breaking for the spring blade.

The above and other objects are accomplished according to the invention by constructing the spring blade to have a varying cross section over its length such that the axial area moment of inertia I of the cross section, divided by one-half the thickness of the blade, is proportional to the distance l of the cross section from the line of action of the spring force F. Each "cross section" of the spring blade is in a plane normal to the longitudinal dimension of the blade at the location of the plane.

Preferably, the spring blade has a varying thickness and a constant width over its length. However, it may also have a varying width over its length with a constant thickness.

It is of advantage if the outline for the varying blade thickness or width is produced by non-turning or turning shaping. For non-turning shaping it is of advantage to employ a rolling process.

Since the tension, or stress, and thus also the deformation, of the spring blade is approximately constant particularly in the spring active region, the elastic deformation capability and the service life of the spring tine can be substantially increased beyond the flow limits of the material employed by intentional preshaping in the direction of the later stresses. This process is known in the applicable literature under the term "presetting".

Embodiments of the invention are illustrated in the drawing and will be described in greater detail below.

DESCRIPTION OF THE PREFERRED EMBODIMENTS

Figure 1:
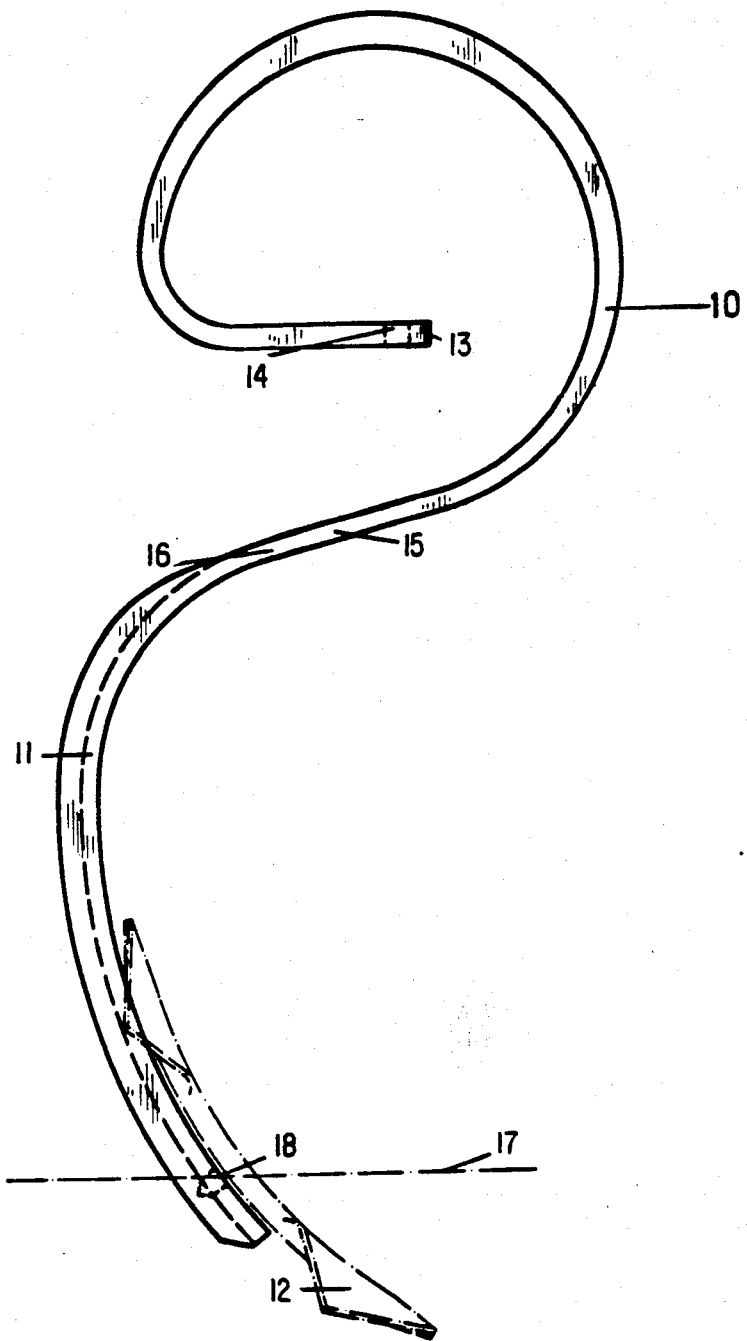
FIG. 1 is a side elevational view of a spring tine according to the invention whose spring blade has a varying thickness over its length with a constant width and which is made in one piece with a carrier.

The spring tine shown in FIG. 1 is made in one piece composed of a spring blade 10 and a carrier 11 for supporting a working member 12 which is to be attached thereto. The spring blade 10 is disposed in the upper region and its upper end 13 is rolled in and is provided with a bore 14 through which a fastening screw can be pushed for fastening the spring tine to a supporting beam of the implement. The spring blade 10 is made of a spring steel of constant width, perpendicular to the plane of FIG. 1, and a thickness, in the plane of FIG. 1, which varies over its length. Blade 10 is bent in one direction and its lower end 15 merges at a point of inflection 16 into a carrier 11 which is bent in the other direction. In the illustrated embodiment the carrier is folded. It is also possible, however, to use carriers which are not folded.

A working member 12 is releasably fastened to the lower end of the carrier 11. In use, member 12 will penetrate into the ground so that the resultant force on the spring tine acts along a line of action 17 at point 18. The cross section, or more specifically the thickness, of the spring blade 10 varies with the linear distance of the cross section from the line of action 17 of the resulting spring force according to the laws of mechanics. In this way, the same stress results in all cross sections of the spring blade 10 during elastic movement so that there no longer exists a point of greatest stress in the spring according to the invention as encountered in the prior art spring at its cross section farthest removed from the line of influence of the spring force. Therefore, the design of the spring blade 10 according to the invention results in a particularly good material utilization of the spring steel.

Figure 2:
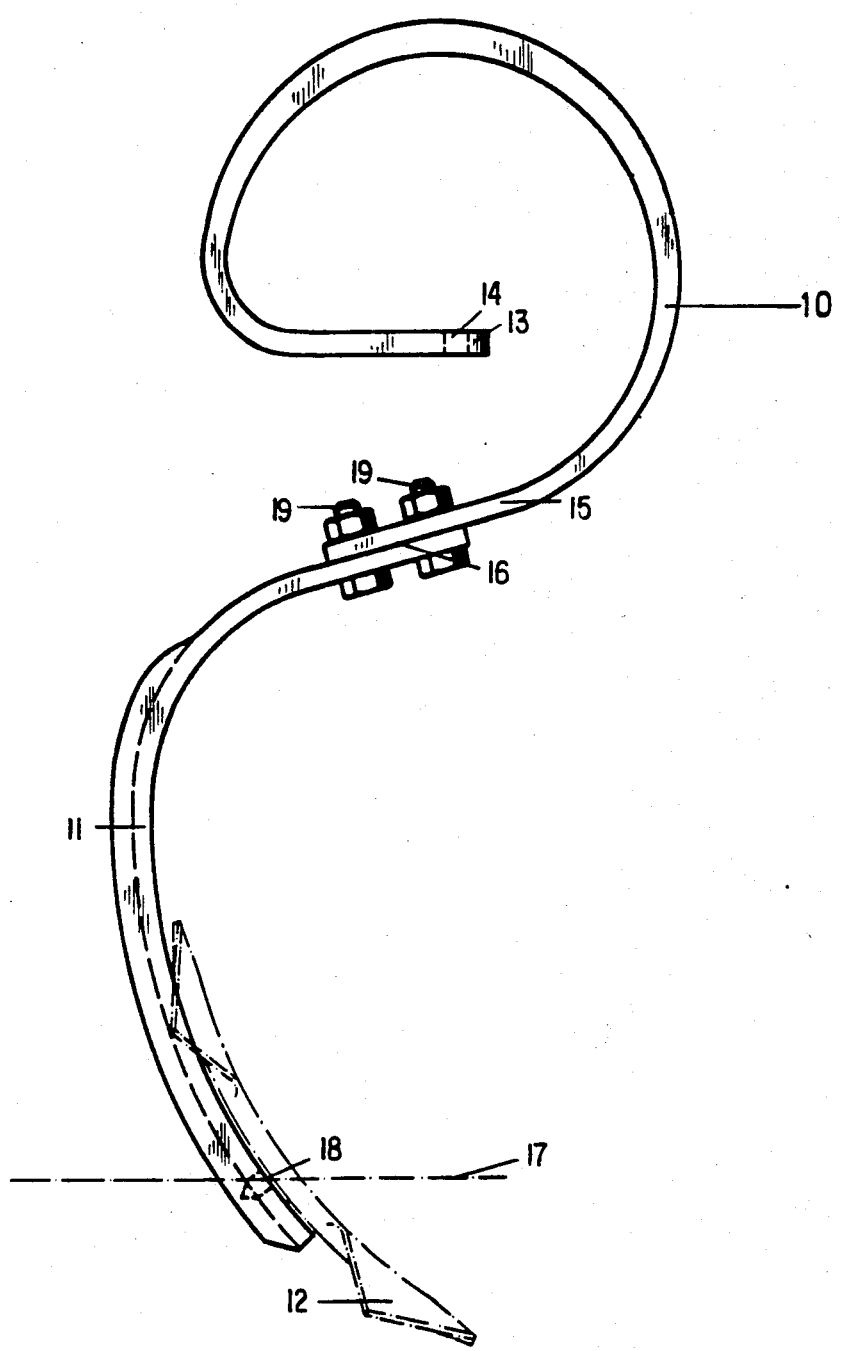
FIG. 2 is a side view similar to that of FIG. 1 of a spring tine according to the invention in which the carrier and the spring blade are connected together by screws.

The spring tine shown in FIG. 2 is constructed basically in the same manner. However, in the region of the inflection point 16 at the lower end 15 of the spring plate 10, this tine is divided, so that the spring blade 10, and the carrier 11 are formed from separate parts. These two parts are releasably connected together by means of bolts 19.

Figure 3:
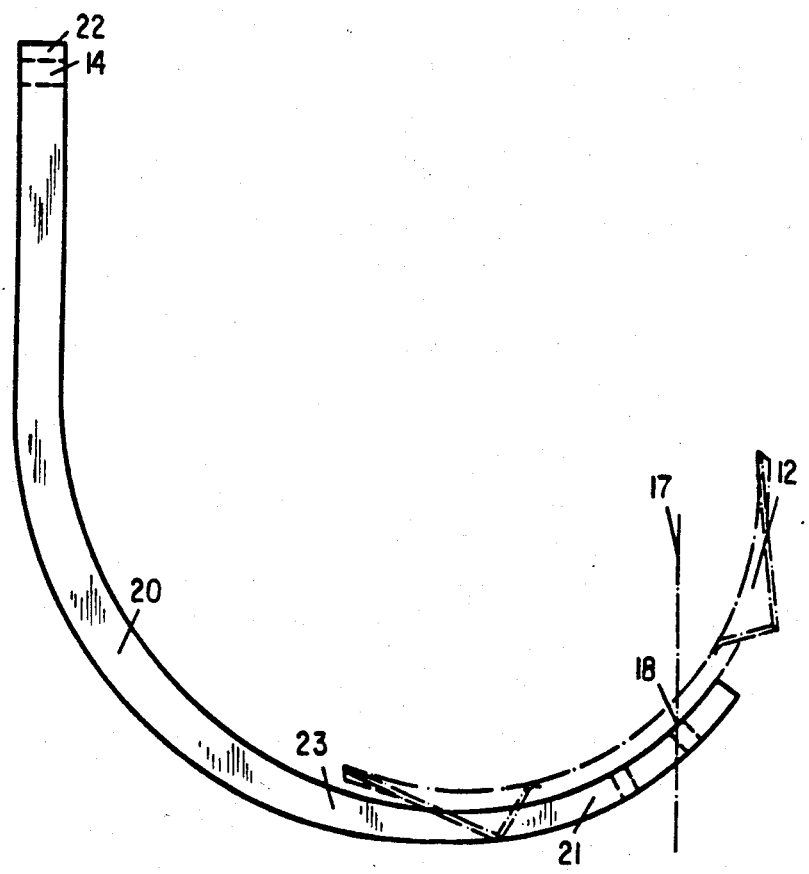
FIG. 3 is a side elevational view of a spring blade according to the invention with a varying thickness over its length and a constant width in a single-piece design with the carrier, which is curved in the same direction as the spring blade.

The spring tine shown in FIG. 3 is made in one piece and includes a spring blade 20 and a carrier 21 which follows at the lower end of the spring blade for carrying the working member 12. At its upper end 22, in which there is provided a bore 14 for fastening to a supporting beam, the spring blade 20 begins with a horizontal orientation, then curves in one direction to its lower end 23, where it is followed by the carrier 21, which curves in the same direction. The lower end of carrier 21 and the point of attack 18 for the spring force are in the region of the line of action 17. The upper end 22 of spring blade 20 may be fastened to the supporting beam in a resilient manner.

Figure 4:
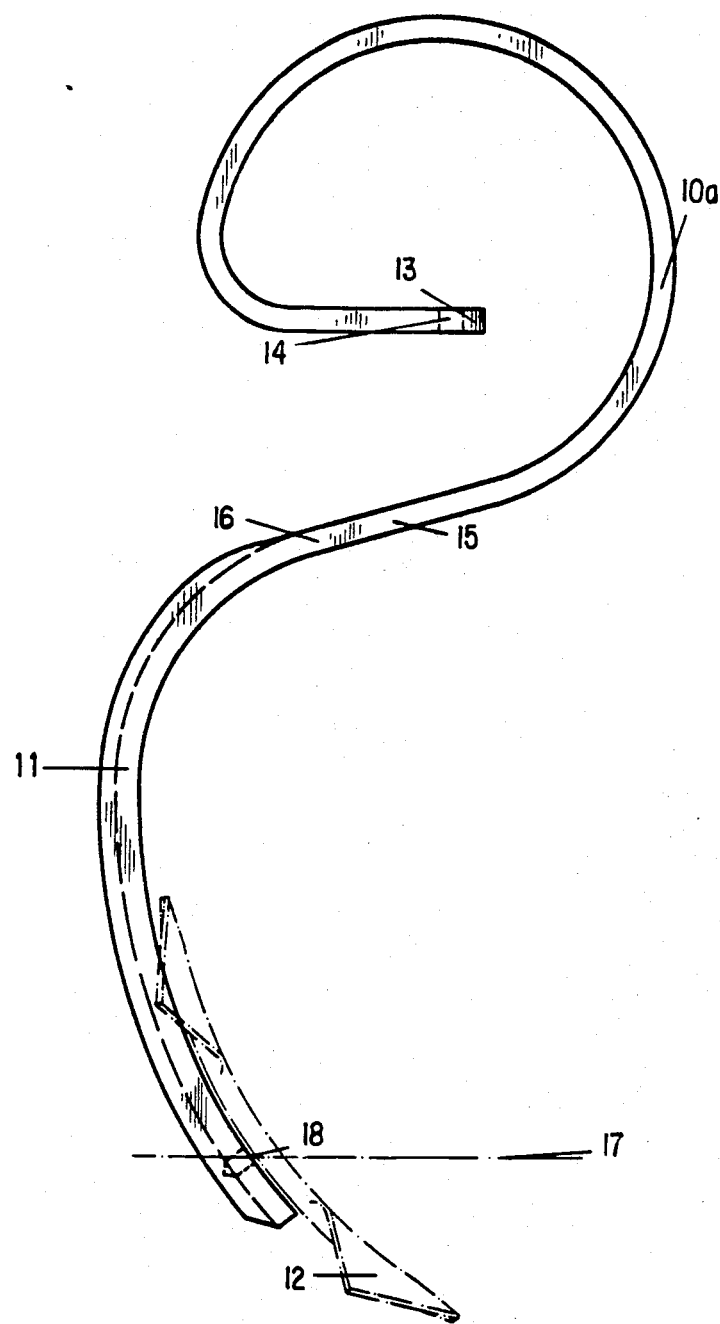
FIG. 4 is a side elevational view of a spring tine according to the invention wherein it is not the thickness but the width of the blade which varies over its length.
Figure 5:
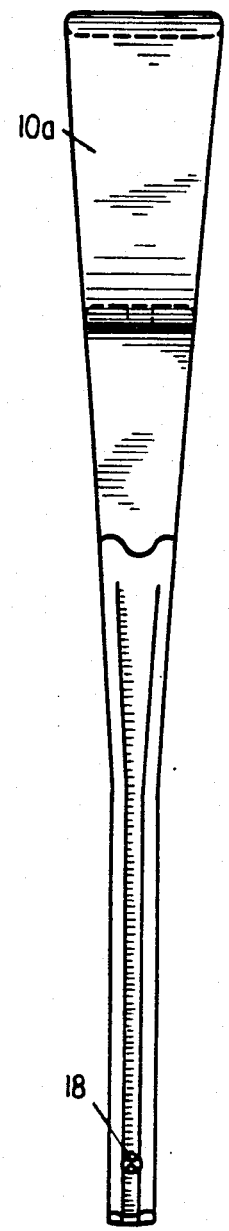
FIG. 5 is a front elevational view of the spring tine of FIG. 4.

The spring tine shown in FIGS. 4 and 5 is provided with a spring blade 10a which does not have a varying thickness and a constant width, as does the spring blade of FIG. 1, but which instead has a varying width, which is apparent from FIG. 5, and a constant thickness. Moreover, this spring blade does not have an exactly rectangular cross section but a cross section which has rounded narrow sided as defined, for example, in DIN [German National Standard] 59,145. This avoids the cutting effect usually emanating from sharp edges.

Figure 6:
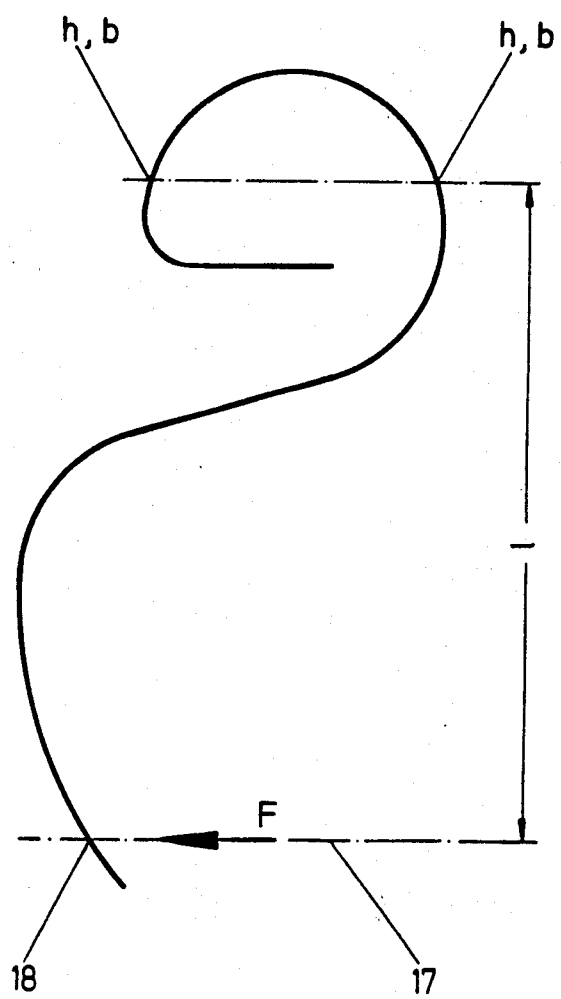
FIG. 6 is a schematic side elevational view of a spring tine with reference lines for calculating the thickness and width of the spring blade.

The schematic illustration of FIG. 6 shows a force F applied to a spring tine, the length l of the straight-line distance of an arbitrarily selected spring blade cross section from the line of action 17 of the force F and the thickness h of the blade in this spring blade cross section. The width b of the cross section is perpendicular to the plane of FIG. 6. The following equation applies for the bending stress:

$$\sigma = \frac{M}{W} = \frac{F \cdot l}{W} = \frac{F \cdot l \cdot h}{2 \cdot I}$$

where

M—is the bending moment,

W—is the resistance moment and

I—is the axial area moment of inertia of the spring blade cross section.

The following equation defines the resistance moment:

$$W = \frac{2 \cdot I}{h},$$

and the following equation defines the axial area moment of inertia of a rectangular cross section having semicircular narrow sides as defined in DIN 59,145

$$I = \frac{b \cdot h^3}{12} \cdot \left(1 - 0.411 \cdot \frac{h}{b}\right)$$

where b = the width of the spring blade cross section.

The variable width and thickness of the leaf of a spring tine can be achieved by machining for instance by milling or grinding. In case of chipless shaping they can be achieved by rolling or forging.

It will be understood that the above description of the present invention is susceptible to various modifications, changes and adaptations, and the same are intended to be comprehended within the meaning and range of equivalents of the appended claims.

What is claimed is:

1. A spring tine for an agricultural implement for soil cultivation, comprising: a bent spring blade having an upper end constituting a point of fastening for releasable attachment to the implement and having a lower end; and a carrier for the attachment of a working member for performing soil cultivation which causes a force to act on said tine along a line of action, said carrier being connected to said lower end of said spring blade; wherein said spring blade has a cross section which varies over its length in such a manner that the axial area moment of inertia I of a cross-sectional plane, divided by one-half the blade thickness, is proportional to the linear distance of that cross-sectional plane from the line of action of the force acting on said tine.

2. Spring tine as defined in claim 1 wherein said spring blade has a thickness which varies over its length and a constant width.

3. Spring tine as defined in claim 2 wherein the thickness dimension of the cross section of said blade is produced by a chipless shaping.

4. Spring tine as defined in claim 2 wherein the thickness dimension of the cross section of said spring blade is produced by machining.

5. Spring tine as defined in claim 1 wherein said spring blade has a varying width over its length and a constant thickness.

6. Spring tine as defined in claim 5 wherein the width dimension of the cross section of said blade is produced by a chipless shaping.

7. Spring tine as defined in claim 5 wherein the width dimension of the cross section of said blade is produced by machining.

8. Spring tine as defined in claim 1 wherein said spring blade is integral with said carrier.

9. Spring tine as defined in claim 1 wherein said spring blade is permanently fastened to said carrier.

10. Spring tine as defined in claim 1 further comprising means detachably fastening said spring blade to said carrier.

* * * * *